United States Patent
Park et al.

(10) Patent No.: US 7,319,224 B2
(45) Date of Patent: Jan. 15, 2008

(54) SEMICONDUCTOR PROBE WITH RESISTIVE TIP AND METHOD OF FABRICATING THE SAME

(75) Inventors: Hong-sik Park, Seoul (KR);
Kyoung-lock Baeck, Busan-si (KR);
Ju-hwan Jung, Seoul (KR);
Hyoung-soo Ko, Seoul (KR);
Chul-min Park, Suwon-si (KR);
Seung-bum Hong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 188 days.

(21) Appl. No.: 11/219,732

(22) Filed: Sep. 7, 2005

(65) Prior Publication Data

US 2006/0060779 A1    Mar. 23, 2006

(30) Foreign Application Priority Data

Sep. 7, 2004    (KR) .................. 10-2004-0071221

(51) Int. Cl.
*G21K 7/00*    (2006.01)
(52) U.S. Cl. .............. 250/306; 250/307; 438/48; 324/762; 324/754; 977/879; 977/878; 977/875; 369/43; 369/126; 422/55; 422/57
(58) Field of Classification Search ................ None
See application file for complete search history.

(56) References Cited

U.S. PATENT DOCUMENTS 6,479,892 B1    11/2002 Hopson et al.

(Continued)

FOREIGN PATENT DOCUMENTS

EP    0984 444 A2    3/2000

(Continued)

OTHER PUBLICATIONS

Park Hongsik et al.: "Scanning resistive probe microscopy: Imaging ferroelectric domains" Applied Physics Letters, AIP, American Institute of Physics, Melville, NY, US, vol. 84, No. 10, Mar. 8, 2004, pp. 1734-1736, XP012060728.

*Primary Examiner*—Jack I. Berman
*Assistant Examiner*—Zia R. Hashmi
(74) *Attorney, Agent, or Firm*—Sughrue Mion, Pllc.

(57) ABSTRACT

Provided are a semiconductor probe with a resistive tip, and a method of fabricating the semiconductor probe. The method includes forming a stripe-shaped mask layer on a substrate doped with a first impurity, and forming first and second electrode regions by heavily doping portions of the substrate not covered by the mask layer with a second impurity opposite in polarity to the first impurity; annealing the substrate to decrease a gap between the first and second semiconductor electrode regions, and forming resistive regions lightly doped with the second impurity at portions contiguous with the first and second semiconductor electrode regions; forming a stripe-shaped first photoresist orthogonal to the mask layer, and etching the mask layer such that the mask layer has a square shape; forming a second photoresist on the substrate to cover a portion of the first photoresist and define a cantilever region; forming the cantilever region by etching portions not covered by the first and second photoresists; and removing the first and second photoresists, and forming a resistive tip having a semi-quadrangular pyramidal shape by etching portions of the substrate not covered by the mask layer.

10 Claims, 9 Drawing Sheets

U.S. PATENT DOCUMENTS 6,812,460 B1 * 11/2004 Stallcup et al. ............. 250/307
7,141,999 B2 * 11/2006 Park et al. .................. 324/762
2006/0252172 A1 * 11/2006 Park et al. .................... 438/48

FOREIGN PATENT DOCUMENTS

| JP | 8-68791 A | 3/1994 |
|---|---|---|
| KR | 2003-0041726 A | 5/2003 |
| KR | 2003-0087372 A | 11/2003 |

\* cited by examiner

SEMICONDUCTOR PROBE WITH RESISTIVE TIP AND METHOD OF FABRICATING THE SAME

BACKGROUND OF THE INVENTION

This application claims the priority of Korean Patent Application No. 2004-71221, filed on Sep. 7, 2004, in the Korean Intellectual Property Office, the disclosure of which is incorporated herein in its entirety by reference.

1. Field of the Invention

The present invention relates to a semiconductor probe with a resistive tip and a method of fabricating the same, and more particularly, to a semiconductor probe with a resistive tip having a semi-quadrangular pyramidal shape, and a method of fabricating the semiconductor probe.

2. Description of the Related Art

As compact products such as mobile communication terminals and electronic pocket notes have become more popular, the demand for highly-integrated nonvolatile micro recording media has increased. It is difficult to further miniaturize existing hard disks or to highly integrate flash memories. Therefore, information storage devices using scanning probe microscopy have been studied as an alternative.

Probes are used in various scanning probe microscopy (SPM) techniques. For example, probes are used for a scanning tunneling microscope (STM) that detects current produced when a voltage is applied between a probe and a sample to reproduce information, an atomic force microscope (AFM) that uses an atomic force between a probe and a sample, a magnetic force microscope (MFM) that uses an interactive force between a magnetic field produced by a sample and a magnetized probe, a scanning near-field optical microscope (SNOM) that overcomes a resolution limitation due to the wavelength of visible light, and an electrostatic force microscope (EFM) that uses an electrostatic force between a sample and a probe.

In order to record and reproduce information at high speed and high density using such SPM techniques, a surface charge in a small area of several tens of nanometers in diameter should be detected. Also, cantilevers should be in the form of an array to increase recording and reproduction speeds.

FIG. 1 is a schematic cross-sectional view of a conventional semiconductor probe disclosed in International Patent Publication No. WO 03/096409.

The semiconductor probe includes a cantilever 10 and a tip 12 formed near one end of the cantilever 10. The tip 12 includes a resistive region and electrode regions formed on both sides of the resistive region. In general, when a physical quantity is measured using the probe, the cantilever 10 is inclined at an angle of about 15 degrees when functioning. When the cantilever 10 is tilted at an angle of θ relative to a substrate 14 contacting the probe, the height of the tip 12 is H, the distance between the tip 12 and an end 11 of the cantilever 10 is D, and the gap G between the end 11 of the cantilever 10 and the substrate 14 contacting the probe is given by Equation 1.

$$G = H \times \cos\theta - D \times \sin\theta \quad (1)$$

When information on a substrate is measured using a resistive tip, a semiconductor probe with a tip having a small height has the following advantages. First, the resistance of the electrode regions decreases, series resistance decreases, and sensitivity increases. Second, a second ion implantation process carried out to reduce the resistance of the electrode regions can be omitted. However, in the conventional probe, the distance D between the end 11 of the cantilever 10 and the tip 12 is considered to make up for an alignment error between the tip 12 and a cantilever mask. Accordingly, if the height of the tip 12 is reduced, the end 11 of the cantilever 10 may come close to the substrate 14 such that the end 11 of the cantilever 10, not the tip 12, first contacts the substrate 14. For example, when an alignment margin between the tip 12 and the end 11 of the cantilever 10 is 1 μm, if the height D of the tip 12 is less than 540 nm, the end 11 of the cantilever 10 contacts the substrate 14.

SUMMARY OF THE INVENTION

The present invention provides a semiconductor probe with a resistive tip formed on an end of a cantilever without an alignment margin, and a method of fabricating the semiconductor probe.

According to one aspect, the present invention provides a semiconductor probe comprising: a tip having a semi-quadrangular pyramidal shape doped with a first impurity; a cantilever having a free end on which the tip is disposed; a resistive region formed at a peak of the tip and lightly doped with a second impurity opposite in polarity to the first impurity; and first and second semiconductor electrode regions heavily doped with the second impurity formed on sloped sides of the tip and separated from each other, the first and second semiconductor electrode regions being electrically connected to the resistive region.

A vertical surface of the tip may be aligned with the free end of the cantilever.

According to another aspect, the present invention provides a method of fabricating a semiconductor probe, which comprises: forming a stripe-shaped mask layer on a substrate doped with a first impurity, and forming first and second electrode regions by heavily doping portions of the substrate not covered by the mask layer with a second impurity opposite in polarity to the first impurity; annealing the substrate to decrease a gap between the first and second semiconductor electrode regions, and forming resistive regions lightly doped with the second impurity at portions contiguous with the first and second semiconductor electrode regions; forming a stripe-shaped first photoresist layer orthogonal to the mask layer, and etching the mask layer such that the mask layer has a square shape; forming a second photoresist layer on the substrate to cover a portion of the first photoresist layer and define a cantilever region; forming the cantilever region by etching portions not covered by the first and second photoresist layers; and removing the first and second photoresist layers, and forming a resistive tip having a semi-quadrangular pyramidal shape by etching portions of the substrate not covered by the mask layer.

The step of annealing the substrate may further comprise diffusing the first and second semiconductor electrode regions to obtain resistive regions which contact each other to form a tip forming portion.

The step of forming the second photoresist layer may further comprise depositing the second photoresist layer to cover the first photoresist layer, and patterning the second photoresist layer such that the patterned second photoresist layer covers the portion of the first photoresist layer on the mask layer.

The step of forming the resistive tip having the semi-quadrangular pyramidal shape may further comprise: forming an oxide layer of a predetermined thickness at a surface of the substrate by heating the substrate, from which the patterned mask layer is removed, in an oxygen atmosphere; and sharpening an end of the resistive regions by removing the oxide layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
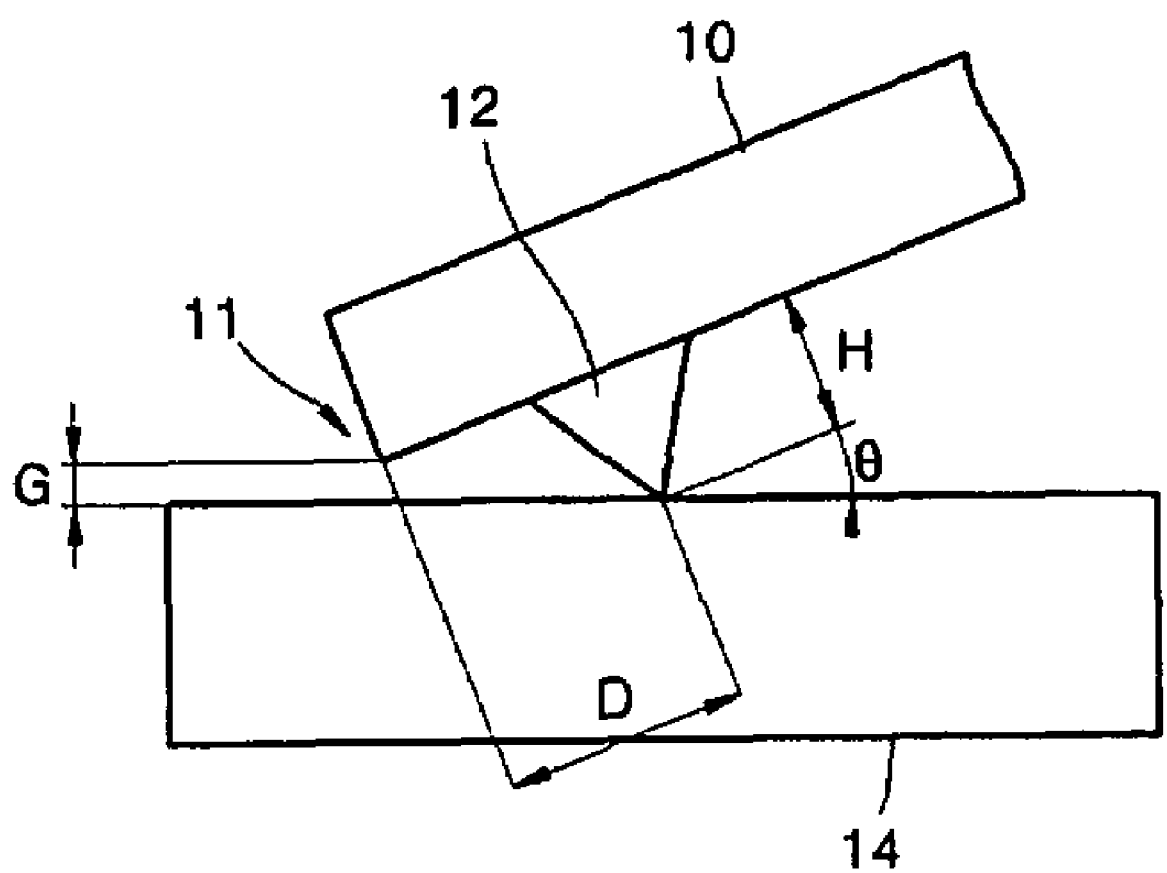
FIG. 1 is a schematic cross-sectional view of a conventional semiconductor probe.

The present invention will now be described more fully with reference to the accompanying drawings, in which embodiments of the invention are shown. However, the present invention should not be construed as being limited thereto. The thicknesses of layers and regions shown in the drawings are exaggerated for clarity.

Figure 2:
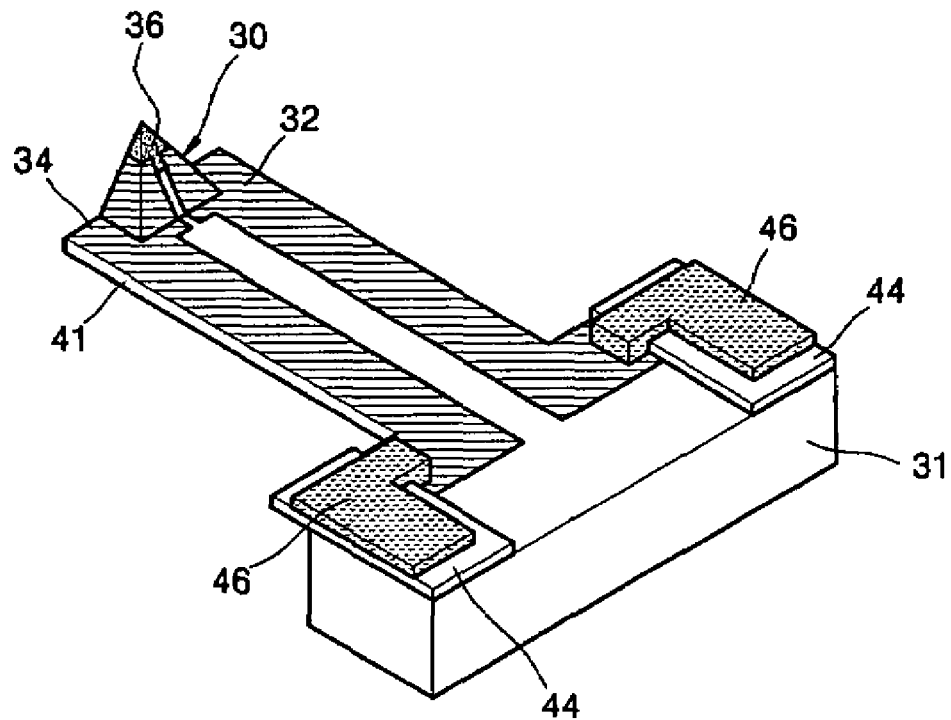
FIG. 2 is a perspective view of a semiconductor probe according to an embodiment of the present invention.

FIG. 2 is a perspective view of a semiconductor probe according to an embodiment of the present invention.

Referring to FIG. 2, an insulating layer 44 is formed on a silicon substrate 31 doped with a first impurity. An electrode 46 is formed on the insulating layer 44. A cantilever 41 extends from a surface of the silicon substrate 31. A resistive tip 30 having a semi-quadrangular pyramidal shape is formed at a free end of the cantilever 41 and extends vertically to the cantilever 41. First and second semiconductor electrode regions 32 and 34 heavily doped with a second impurity are formed on sloped sides of the resistive tip 30. A resistive region 36 lightly doped with the second impurity is positioned on a peak of the tip 30. The first and second semiconductor electrode regions 32 and 34 are electrically connected to the resistive region 36, and are connected to the electrode 46 via the cantilever 41. The tip 30 is formed on the cantilever 41 without an alignment margin. That is, a vertical surface of the tip 30 is aligned with the free end of the cantilever 41.

Figure 3:
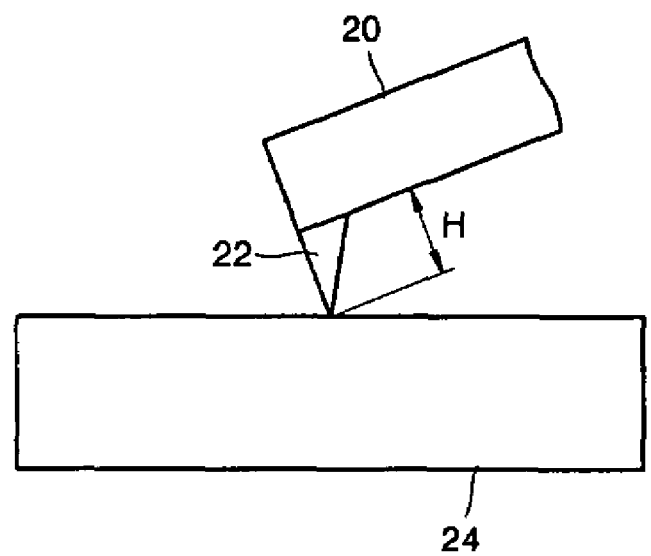
FIG. 3 is a schematic cross-sectional view of a semiconductor probe according to an embodiment of the present invention.

FIG. 3 is a schematic cross-sectional view of a semiconductor probe according to an embodiment of the present invention.

Referring to FIG. 3, the probe includes a cantilever 20, and a tip 22 having a semi-quadrangular pyramidal shape, which is formed at a free end of the cantilever 20. The end of the cantilever 20 does not contact an object 24 to be probed since there is no alignment margin (see D shown in FIG. 1) in consideration of the problem in the conventional art. Accordingly, the height of the resistive tip 22 is not restricted when being fabricated.

FIGS. 4A through 4L are perspective views illustrating a method of fabricating the semiconductor probe shown in FIG. 2 according to an embodiment of the present invention.

Figure 4A:
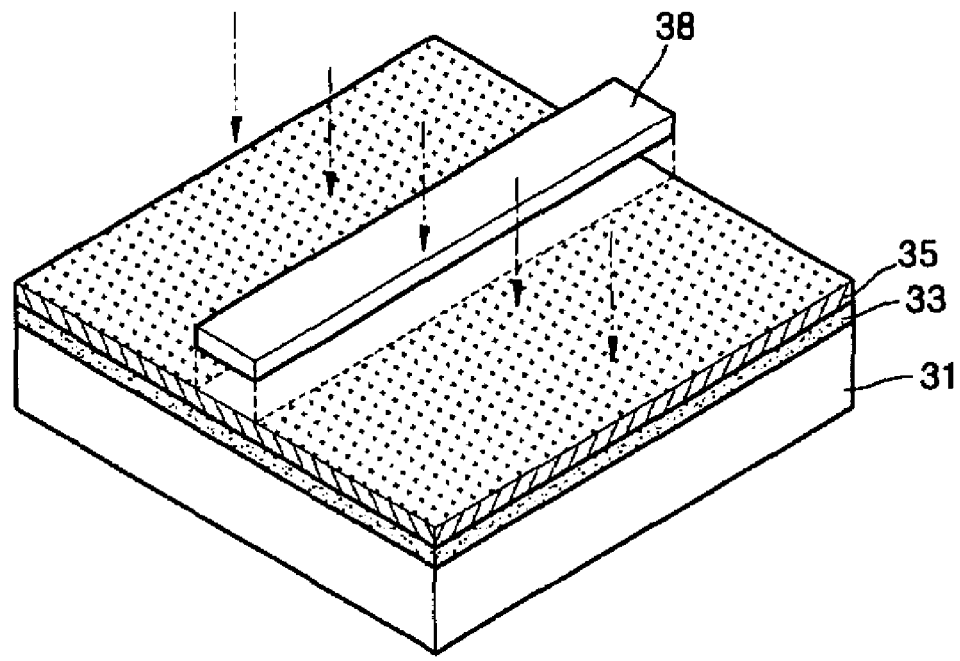
FIGS. 4A through 4L are schematic perspective views illustrating a method of fabricating the semiconductor probe shown in FIG. 2 according to an embodiment of the present invention.

Referring to FIG. 4A, a mask layer 33, such as a silicon oxide layer or a silicon nitride layer, is formed on the silicon substrate 31 or silicon on insulator (SOI) substrate, which is doped with a first impurity. A photoresist layer 35 is deposited on the surface of the mask layer 33. Then, a stripe-shaped mask 38 is disposed over the photoresist layer 35.

Figure 4B:
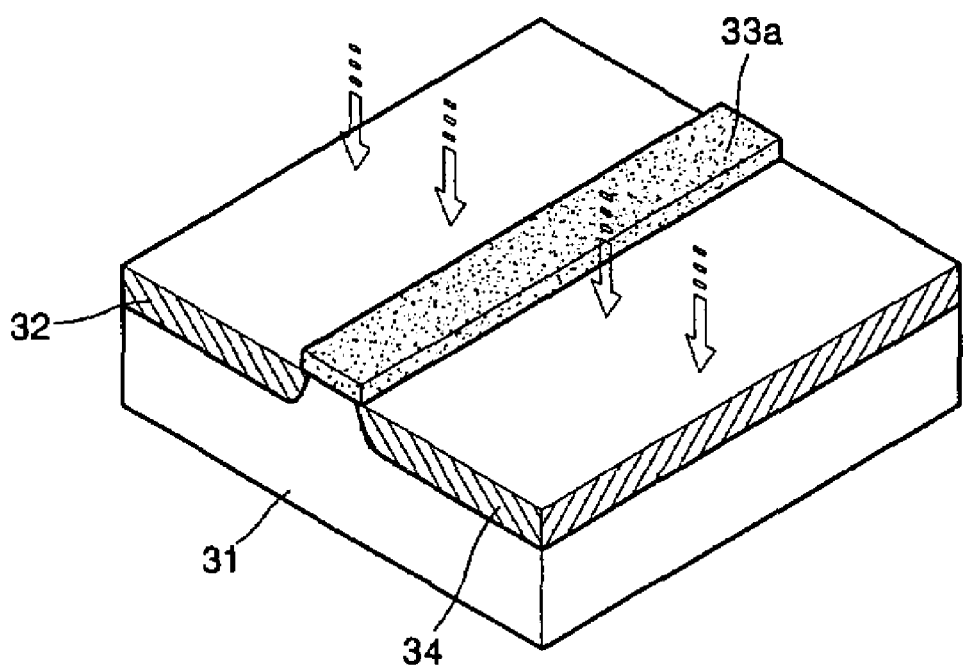

Next, the resultant structure is patterned through exposure, development, and etching processes. Referring to FIG. 4B, a stripe-shaped mask layer 33a is formed on the substrate 31 through photolithography and etching processes, and then, portions of the substrate 31 not below the mask layer 33a are heavily doped with a second impurity to form the first and second semiconductor electrode regions 32 and 34. The resistivity of the first and second semiconductor electrode regions 32 and 34 is sufficiently low such that they can serve as conductors.

Figure 4C:
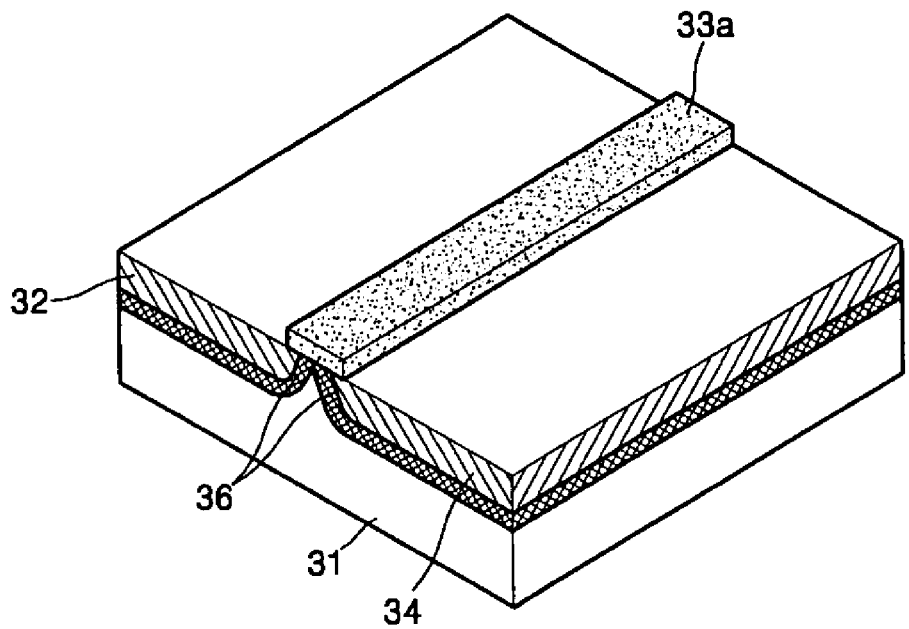

Next, an annealing process is performed on the substrate 31 to make the distance between the first and second semiconductor electrode regions 32 and 34 smaller than the width of the mask layer 33a. Referring to FIG. 4C, when the first and second semiconductor electrode regions 32 and 34 heavily doped with the second impurity expand, the second impurity is diffused to portions contiguous with the first and second semiconductor electrode regions 32 and 34 to form resistive regions 36 lightly doped with the second impurity. The resistive regions 36 under the mask layer 33a contact each other to form a tip forming portion of the resistive tip, which will be described below. The contact between the resistive regions 36 may be formed in a thermal oxidization process, which will be explained below.

Figure 4D:
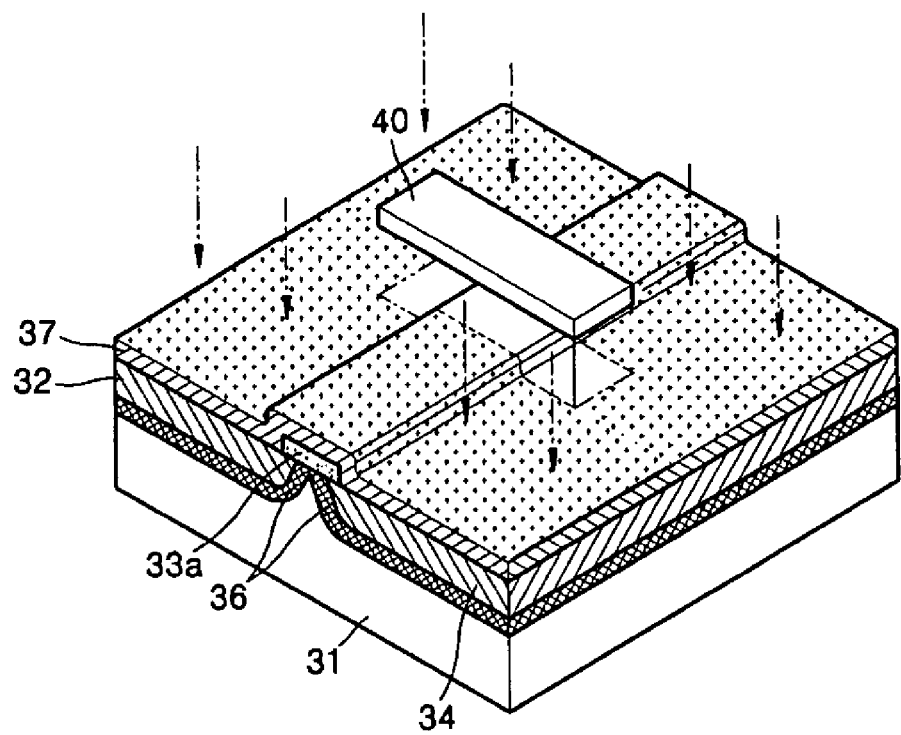
Figure 4E:
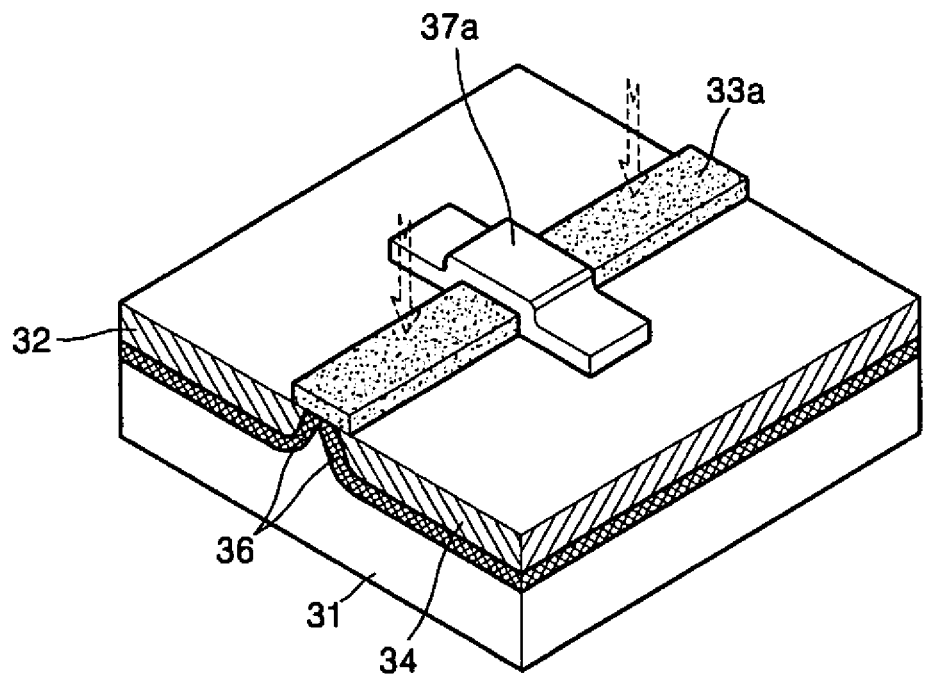

Then, referring to FIG. 4D another photoresist layer 37 is deposited on the substrate 31 to cover the mask layer 33a, and then a stripe-shaped photo mask 40 is disposed over the photoresist layer 37 orthogonally to the mask layer 33a. Thereafter, referring to FIG. 4E, the resultant structure is exposed, developed, and etched to form a photoresist layer 37a having the same shape as the photo mask 40.

Figure 4F:
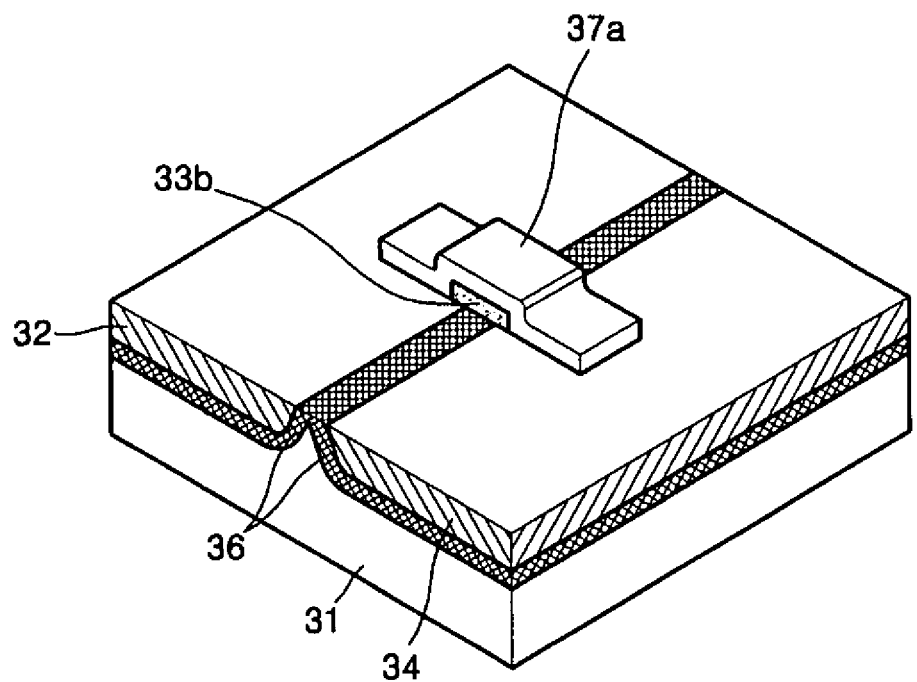

Thereafter, referring to FIG. 4F, portions of the mask layer 33a not covered by the stripe-shaped photoresist layer 37a are dry etched to form a square mask layer 33b.

Figure 4G:
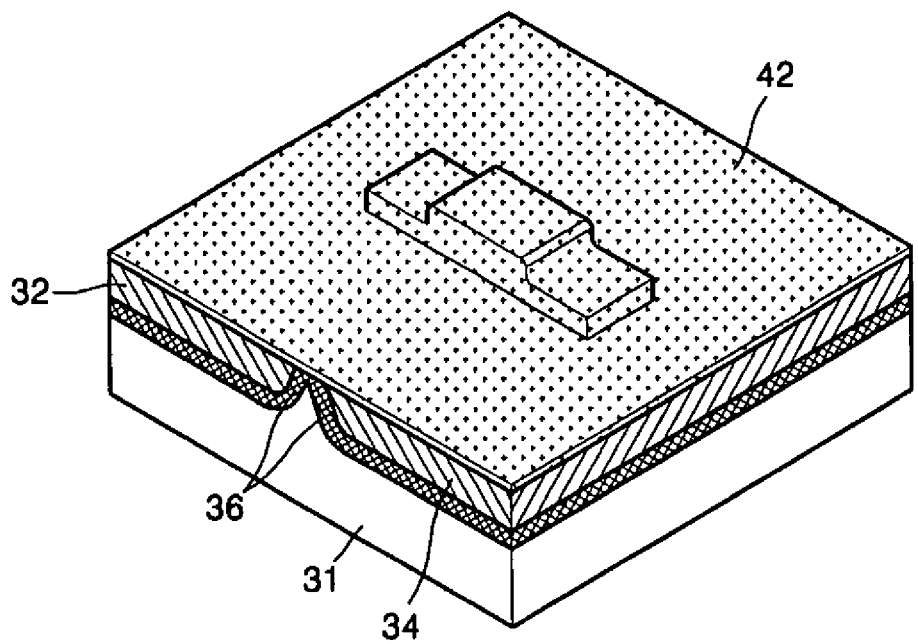

Next, referring to FIG. 4G, a photoresist layer 42 is formed on the substrate 31 to cover the photoresist layer 37a. The photoresist layer 42 may be coated after the photoresist layer 37a is baked, or the photoresist layer 42 may be composed of a material that is selectively patterned relative to the photoresist layer 37a. The photoresist layer 42 deposited on the photoresist layer 37a can be simply patterned if the photoresist layer 42 lies on the photoresist layer 37a, without requiring an additional alignment margin.

Figure 4H:
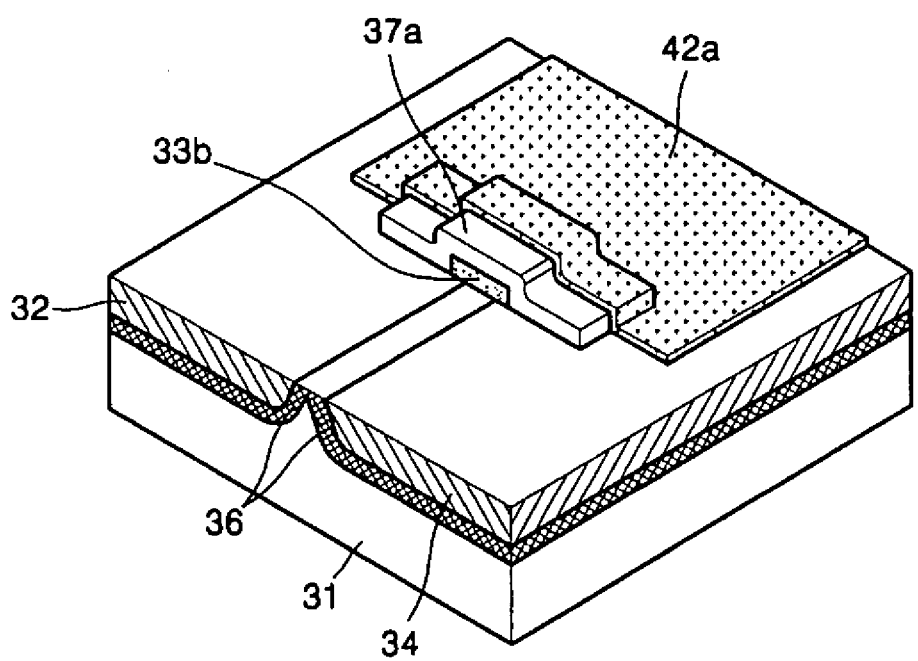

Next, referring to FIG. 4H, the photoresist layer 42 is selectively patterned to form patterned photoresist layer 42a that covers a portion (e.g., half) of the photoresist layer 37a. This is used to define a cantilever region. The cantilever region is partially shown in FIGS. 4H through 4K for convenience.

Figure 4I:
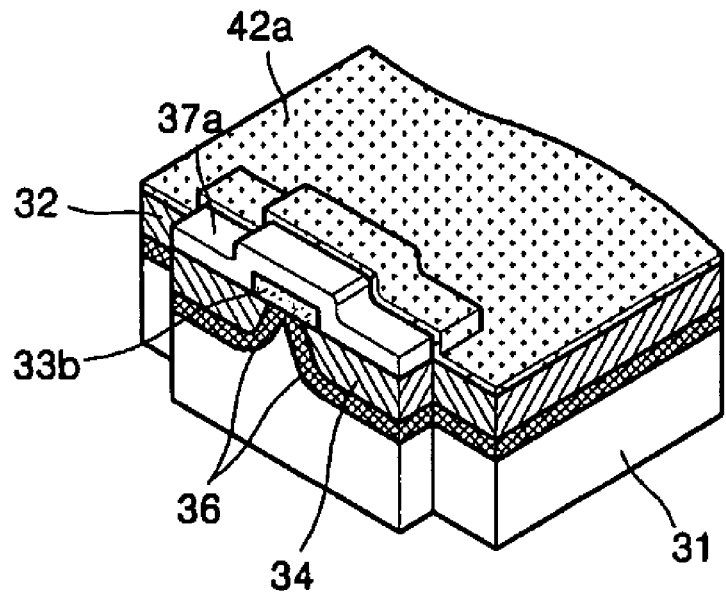

Referring to FIG. 4I, a portion not to be included in the cantilever region is dry etched using patterned photoresist layers 37a and 42a as masks.

Figure 4J:
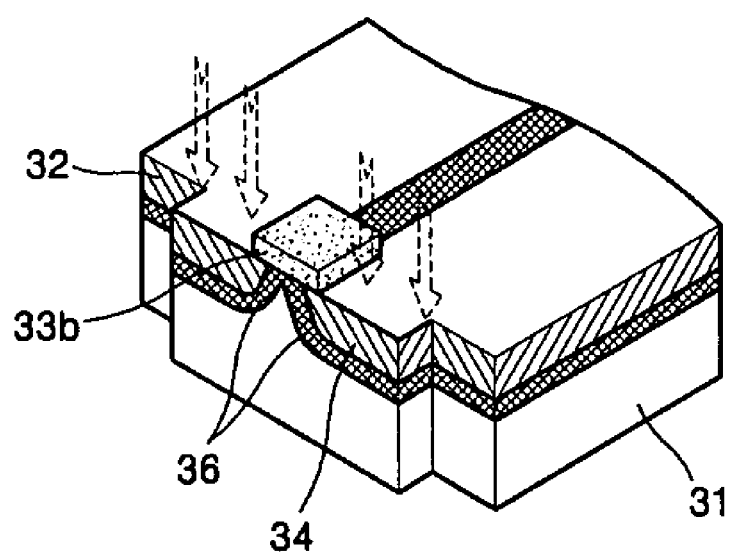

Referring to FIG. 4J, after the photoresist layers 37a and 42a are removed, the substrate 31 is wet or dry etched using the square mask layer 33b as a mask.

Figure 4K:
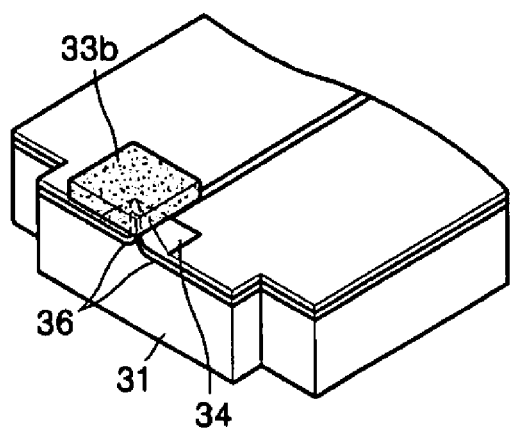

Referring to FIG. 4K, the first and second semiconductor electrode regions 32 and 34 are positioned at sloped sides of the tip 30, the tip 30 has a semi-quadrangular pyramidal shape, and the resistive regions 36 are aligned at the peak of the tip 30.

Next, after the mask layer 33b is removed, the substrate 31 is heated in an oxygen atmosphere to form a silicon oxide layer (not shown) of a predetermined thickness at a surface of the substrate 31. When the oxide layer is removed, the end of the resistive regions 36 is sharpened. After this thermal oxidation process, the tip 30 is sharpened, and the separated resistive regions 36 can contact each other to form the tip forming portion.

Next, the bottom surface of the substrate 31 is etched to form the cantilever 41 extending from the substrate 31. The free end of the cantilever 41 is aligned with the vertical surface of the tip 30.

Figure 4L:
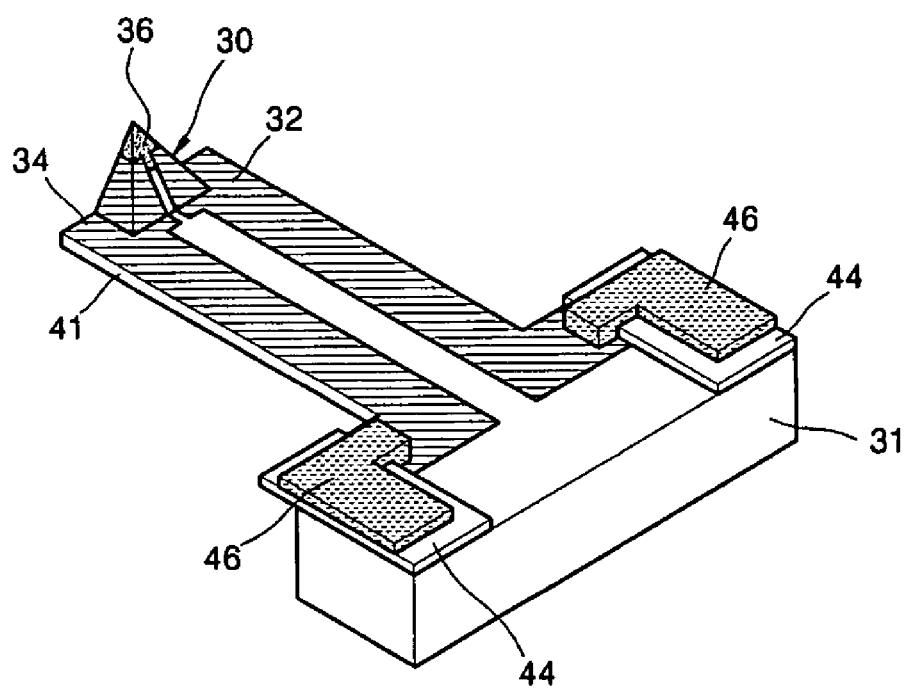

The insulating layer 44 and the electrode pad layer 46 are sequentially stacked and patterned on end portions of the first and second semiconductor electrode regions 32 and 34 by well-known semiconductor processes, to complete the semiconductor probe as shown in FIG. 4L.

In the method of fabricating the semiconductor probe according to the present embodiment, an ion implantation process for forming the first and second semiconductor electrode regions 32 and 34 is performed before fabricating the tip 30, such that a fine photolithographic process can be performed and the resistive regions 36 can be easily formed through a thermal diffusion process.

In addition, the resistive tip 30 can be manufactured in a self-aligned manner if the photoresist layer 42 is patterned on the square mask 33b. Accordingly, since an alignment margin corresponding to the width of the mask 33b may be greater than 1 μm, the semiconductor probe with the resistive tip can be more easily fabricated.

Furthermore, since the tip having the semi-quadrangular pyramidal shape is aligned with the end of the cantilever, the end of the cantilever does not contact the substrate even though the height of the tip is reduced. Accordingly, signal noise can be reduced and the resolution of recorded or reproduced data can be improved.

Figure 5:
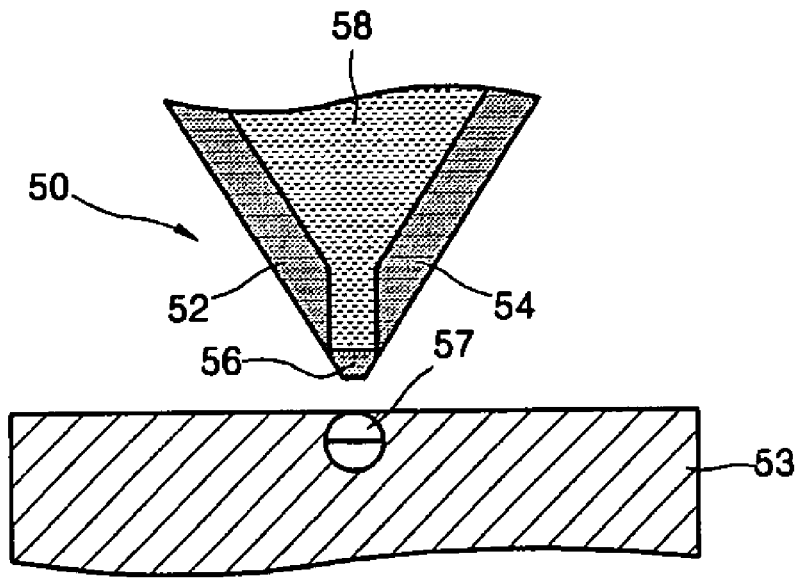
FIGS. 5 and 6 are schematic cross-sectional views illustrating the function of a semiconductor probe with a resistive tip according to an embodiment of the present invention.

FIG. 5 is a schematic cross-sectional view of a resistive tip of a semiconductor probe according to an embodiment of the present invention.

Referring to FIG. 5, a tip 50 of the semiconductor probe includes a body 58 doped with a first impurity, a resistive region 56 lightly doped with a second impurity and disposed at a peak of the tip 50, and first and second semiconductor electrode regions 52 and 54 positioned on sloped sides of the tip 50 with the resistive region 56 therebetween and heavily doped with the second impurity. If the first impurity is a p-type impurity, the second impurity is an n-type impurity, and if the first impurity an n-type impurity, the second impurity are a p-type impurity.

The quantity of a surface charge 57 of a recording medium 53 affects the intensity of an electric field. A change in the intensity of the electric field causes a change in resistance of the resistive region 56. The polarity and density of the surface charge 57 can be detected from a variation in the resistance of the resistive region 56.

Figure 6:
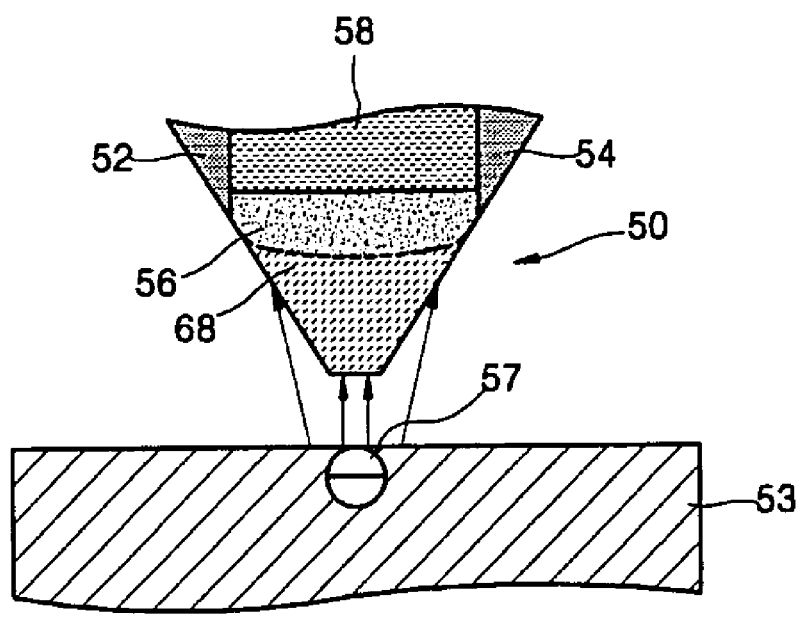

FIG. 6 is an enlarged view of an end portion of the tip 50 of the semiconductor probe shown in FIG. 5.

Although a depletion region 68 of the resistive region 56 does not extend to the first and second semiconductor electrode regions 52 and 54, the area of the resistive region 56 is reduced due to the depletion region 68, which acts as a non-conductor. Consequently, the resistance value of the resistive region 56 varies, making it possible to detect the polarity and density of the surface charge 57. The tip 50 of the semiconductor probe has superior sensitivity than a conventional field effect transistor (FET) tip. This is because a threshold electric field for sensing a surface charge is lowered.

The depletion region 68 gradually expands toward the first and second semiconductor electrode regions 52 and 54 due to an electric field produced by the negative surface charge 57.

According to the semiconductor probe with the resistive tip of the present invention, since the end of the cantilever and the tip are aligned with each other, signal noise caused by reaction of the end of the cantilever with information in the substrate can be reduced, the height of the tip can be reduced, series resistance can be reduced, and a second ion implantation process can be omitted.

Further, according to the method of fabricating the semiconductor probe with the resistive tip of the present invention, since the resistive regions existing between the semiconductor electrode regions can be formed at the center of the peak of the tip due to self-alignment and can also be lightly doped with a second impurity through a thermal diffusion process, the semiconductor probe fabrication process can be simplified.

Moreover, since the photoresist layer for forming the cantilever is patterned on a photoresist layer having the same width as the mask for forming the resistive tip, the resistive tip can be easily fabricated without an alignment margin. As a result, the yield of the semiconductor probe with the resistive tip can be enhanced.

Since the narrow resistive regions can be formed at the tip, which protrudes from the end of the cantilever of the probe, it is easy to fabricate a nano-scale device using a scanning probe microscopy technique to detect a small surface charge present in a small region on a recording medium.

Additionally, when the probe according to the present invention is applied to a high capacity, ultra-small information storage device using a scanning probe microscopy technique, a charge present in a small region can be detected to record and reproduce information.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A semiconductor probe comprising:
   a tip having a semi-quadrangular pyramidal shape and doped with a first impurity;
   a cantilever having a free end on which the tip is disposed;
   a resistive region formed at a peak of the tip and lightly doped with a second impurity opposite in polarity to the first impurity; and
   first and second semiconductor electrode regions heavily doped with the second impurity formed on sloped sides of the tip and separated from each other, the first and second semiconductor electrode regions being electrically connected to the resistive region,
   wherein a vertical surface of the tip is aligned with the free end of the cantilever.

2. The semiconductor probe of claim 1, wherein the first impurity is a p-type impurity, and the second impurity is an n-type impurity.

3. The semiconductor probe of claim 1, wherein the first impurity is an n-type impurity, and the second impurity is a p-type impurity.

4. A method of fabricating a semiconductor probe, said semiconductor probe comprising:

a tip having a semi-quadrangular pyramidal shape and doped with a first impurity;

a cantilever having a free end on which the tip is disposed;

a resistive region formed at a peak of the tip and lightly doped with a second impurity opposite in polarity to the first impurity; and first and second semiconductor electrode regions heavily doped with the second impurity formed on sloped sides of the tip and separated from each other, the first and second semiconductor electrode regions being electrically connected to the resistive region, wherein a vertical surface of the tip is aligned with the free end of the cantilever, said method comprising:

forming a stripe-shaped mask layer on a substrate doped with a first impurity, and forming first and second electrode regions by heavily doping portions of the substrate not covered by the mask layer with a second impurity opposite in polarity to the first impurity;

annealing the substrate to decrease a gap between the first and second semiconductor electrode regions, and forming resistive regions lightly doped with the second impurity at portions contiguous with the first and second semiconductor electrode regions;

forming a stripe-shaped first photoresist layer orthogonal to the mask layer, and etching the mask layer such that the mask layer has a square shape;

forming a second photoresist layer on the substrate to cover a portion of the first photoresist and define a cantilever region;

forming the cantilever region by etching portions not covered by the first and second photoresist layers; and removing the first and second photoresist layers, and forming a resistive tip having a semi-quadrangular pyramidal shape by etching portions of the substrate not covered by the mask layer.

5. The method of claim 4, wherein said annealing of the substrate further comprises diffusing the first and second semiconductor electrode regions to obtain resistive regions which contact each other to form a tip forming portion.

6. The method of claim 4, wherein said forming of the second photoresist layer further comprises depositing the second photoresist layer to cover the first photoresist layer, and patterning the second photoresist layer such that the patterned second photoresist layer covers the portion of the first photoresist layer on the mask layer.

7. The method of claim 4, wherein said forming of the resistive tip having the semi-quadrangular pyramidal shape further comprises:

forming an oxide layer of a predetermined thickness at a surface of the substrate by heating the substrate, from which the patterned mask layer is removed, in an oxygen atmosphere; and sharpening an end of the resistive regions by removing the oxide layer.

8. The method of claim 7, wherein said heating of the substrate forms a tip forming portion by diffusing the first and second semiconductor electrode regions to obtain resistive regions.

9. The method of claim 4, wherein the first impurity is a p-type impurity, and the second impurity is an n-type impurity.

10. The method of claim 4, wherein the first impurity is an n-type impurity, and the second impurity is a p-type impurity.

* * * * *